(12) United States Patent
Padula, I et al.

(10) Patent No.: US 7,789,508 B2
(45) Date of Patent: Sep. 7, 2010

(54) PROGRESSIVE ENHANCED VISUAL FIELD PRISM

(76) Inventors: William V. Padula, I, 37 Soundview Rd., Guilford, CT (US) 06437; William V. Padula, II, 37 Soundview Rd., Guilford, CT (US) 06437; William V. Padula, III, 37 Soundview Rd., Guilford, CT (US) 06437

( * ) Notice: Subject to any disclaimer, the term of this patent is extended or adjusted under 35 U.S.C. 154(b) by 786 days.

(21) Appl. No.: 11/818,957

(22) Filed: Nov. 18, 2005

(65) Prior Publication Data
US 2008/0137033 A1    Jun. 12, 2008

(51) Int. Cl.
*G02C 7/02* (2006.01)

(52) U.S. Cl. .................. 351/175; 351/170; 351/177; 351/47; 351/172; 351/203

(58) Field of Classification Search .......... 351/170, 351/175
See application file for complete search history.

(56) References Cited

U.S. PATENT DOCUMENTS

| | | | | |
|---|---|---|---|---|
| 5,002,364 A | * | 3/1991 | Steenblik | 359/15 |
| 5,452,030 A | * | 9/1995 | Feinbloom | 351/175 |
| 5,579,158 A | * | 11/1996 | Padula | 359/482 |
| 6,099,124 A | * | 8/2000 | Hidaji | 351/202 |
| 7,374,284 B2 | * | 5/2008 | Peli | 351/175 |
| 2005/0248723 A1 | * | 11/2005 | Mohan | 351/170 |

OTHER PUBLICATIONS

William Padula and Stephanie Argyris, Post-Trauma Vision Syndrome: Part II, *Visual Midline Shift Syndrome*, (1996).
Eli Peli, "Field Expansion for Homonymous Hemiaopsia by Optically Induced Peripheral Exotropsia", *Optometry and Vision Science*, Eli Peli, DO, vol. 77, No. 9, pp. 453-464, (2000).
"Vision Aids for People Having Homonymous Hemianopsia" by the National Institute for Rehabilitation Engineering (1987).

* cited by examiner

*Primary Examiner*—Jessica T Stultz
(74) *Attorney, Agent, or Firm*—William L. Androlia; H. Henry Koda

(57) ABSTRACT

The enhanced visual field prism optical apparatus includes a pair of eye glasses frames having the users prescription provided therein, if needed, and an enhanced field prism rotatably supported in front of at least one of the lenses of the frames. For binocular vision, a prism is rotatably supported in front of both lenses of the frames.

9 Claims, 2 Drawing Sheets

PROGRESSIVE ENHANCED VISUAL FIELD PRISM

BACKGROUND OF THE INVENTION

1. Field of Invention

The invention relates to optical devices to compensate for visual defects, particularly visual field loss.

2. Prior Art

Individuals who have suffered a cerebrovascular accident (CVA) or traumatic brain injury (TBI) sometimes incur a homonymous hemianopsia (visual field loss) that affects the same visual field projected from either eye. For example, an individual with a neurological event affecting the left cerebral hemisphere may incur a right homonymous hemianopsia. This means that the right visual field of both eyes will be obliterated due to a loss of sensory function in the visual system. It causes difficulty fixating on objects and people because half of the object or person will be missing. For example, an individual will only see half of a person's face when aiming both eyes directly at the person before them.

A visual field loss also causes a visual midline shift syndrome which has been documented in literature (*Visual Midline Shift Syndrome*, William Padula and Stephanie Argyris (1996)). A visual midline shift syndrome usually shifts opposite the side of the visual field loss causing problems with balance and orientation in space. Treatment with yoked prisms has been found effective for shifting the midline to a more centered position, thereby increasing weight bearing to the affected side and improving posture and balance. The visual field loss, however, remains a functional interference as well as an issue of safety. Objects on the side of the field loss will be totally undetectable.

Enhanced field prism systems have been used effectively to improve awareness of objects and space in the affected field. To utilize these prisms, a prism system is placed embedded or onto the eyeglass lenses. For an individual with a right homonymous hemianopsia, one or two prisms is applied to the lens or lenses ("Field Expansion for Homonymous Hemiaopsia by Optically Induced Peripheral Exotropsia", *Optometry and Vision Science*, Eli Peli, DO, Vol. 77, No 9, PP 453-464 and "Vision Aids for People Having Homonymous Hemianopsia" by the National Institute for Rehabilitation Engineering (1987)). If a monocular system is being temporal designed, the prism is placed base-out toward the temporal side of the lens with the apex aligning just temporal to the line of sight of the right eye. When an individual looks straight ahead, they will not see the prism until they shift or scan to the right and the line of sight is bisected by the prism. The prism will shift an image in the right field in a more nasal direction so that objects through the prism appear more directly in front of the person. Upon removing the prism glasses, the individual will find that the object is further to the right. If the device is used binocularly, two prisms are placed; one on each lens. For the left lens, the base-out end of the prism is placed on the nasal border of the lens with the apex of the prism aligned just nasally to the line of sight of the left eye. When individuals have a homonymous hemianopsia and attempt to read, they will have significant difficulties since their field loss often interferes with their ability to shift their eyes. For an individual with a right homonymous hemianopsia, it is as if they are always attempting to read into the blind field. Many of these individuals only see several letters or one word at a time. It makes reading tedious and frustrating. Individuals with a left homonymous hemianopsia will often be able to read across a line of print, but due to a field loss on the left side will have difficulty finding the next line of print.

Individuals who are utilizing the enhanced field prism system for ambulation and navigation will still often miss objects in their periphery if their scan is not complete.

BRIEF SUMMARY OF THE INVENTION

It is a general object of the present invention to overcome the deficiencies of the prior art.

It is a further object of the present invention to provide an enhanced correction device which is simple in construction and easy to use.

The above mentioned features and objects of the present invention are accomplished by an enhanced visual field prism optical apparatus including a pair of eye glasses having the users prescription provided therein and include ear pieces, lens supports and a bridge piece. An enhanced field prism rotatably is supported in front of at least one of the lenses of the pair of eye glasses. For binocular vision, a prism is rotatably supported in front of both lenses of the eye glasses. By rotating the prisms the midline of the vision can be shifted to meet the current conditions and environment of the user to match the user's visions requirements to the required use.

BRIEF DESCRIPTION OF THE DRAWINGS

The above mention features and objects are described in conjunction with the accompanying drawings in which like numeral denote like elements and in which.

DETAILED DESCRIPTION OF THE INVENTION

Figure 1:
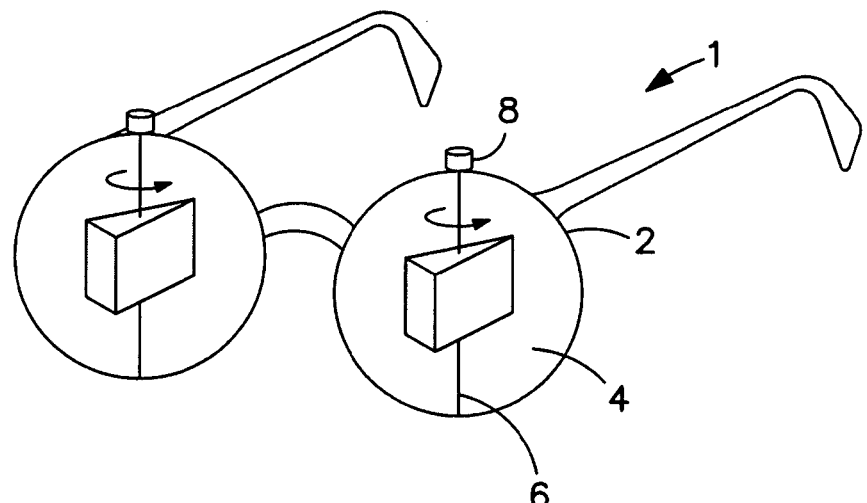
FIG. 1 is a perspective view of a first embodiment of the present invention.
Figure 2:
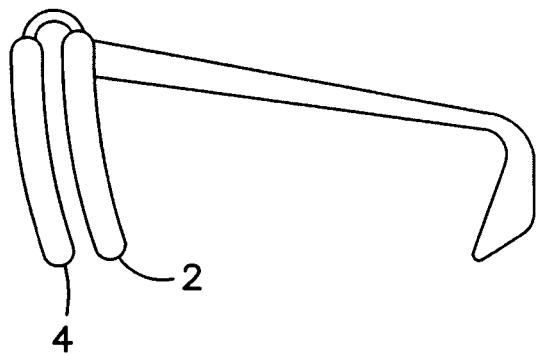
FIG. 2 is a side view of the embodiment of FIG. 1.

Referring to FIGS. 1 and 2, shown therein is an enhanced field prism optical apparatus of the present invention. The apparatus is mounted to an eye glass frame 1. If required for clear vision, the eyeglasses has lenses 2 with the required vision correction. The prisms 4 are rotatably supported on frame 1 by means of an axle 6 which is rotatably coupled to the frame 1; however other means could be used which are well known to those in the art. A knob 8 is provided on the axles 6 in order to easily rotate the prisms 4.

The number of the prism diopters is selected based upon the age and how well the user tolerates the higher numbers. It is generally accepted that the higher the number of the prism diopters, the greater will the filed be enhanced.

In use the present invention is a new concept in assisting individuals who have a homonymous hemianopsia or sector visual field loss interfering with space orientation, ambulation, and scanning. It uses a distortion effect in the prism 4 to compress the field of vision loss. For example, if there is a right homonymous hemianopsia, a base-right yoked prism 4 will be positioned in front of the individual's eyes, as shown in FIG. 1. The purpose of the prism 4 will be to first treat the visual midline shift syndrome that often affects balance and posture. Secondly, it will enhance awareness of objects in the sector or homonymous hemianopic field. A progressive compression of the field can be accomplished in one of two ways.

If a base-right prism 4 is placed before an individual with a right homonymous hemianopsia and the prism 4 is rotated using knob 8 so the apex is toward the eyes and the base end is away from the eyes, a minus cylinder axis 90 degrees of induced compression will occur as the individual looks through the diagonally projected prism 4 as shown in FIG. 1. This minus cylinder axis 90 distortion will compress the field and give an enhanced progressive prismatic effect toward the base end of the prism 4. By doing this, the visual midline shift syndrome can be treated in conjunction with improving the field.

The advantage to this system is that there is no line of demarcation produced by placing a sector prism mounted in or on a lenses 2. There is no abrupt image jump as would be produced through a sector prism application. The apparatus of the present invention produces a progressive increase in the compression of space toward the base end of the prism. Individuals can be taught to scan into the prism 4 and recognize hazardous objects during ambulation. When reading, an individual will be able to read from left to right.

In addition, as they project their scan into the right field, the minus cylinder axis 90 and the base-out prism will cause a compression of the letters in the 180 degree axis and enable more letters and potentially more words to be seen with less movement of the eyes. This will also benefit those with a left homonymous hemianopsia by enabling them to shift their gaze from the end of one line of print to the beginning of the next line. In the case of a left homonymous hemianopsia, base-left prism (opposite to that shown in FIG. 1) will be used either monocularly for those with only one eye or binocularly for those with two eyes.

Figure 3:
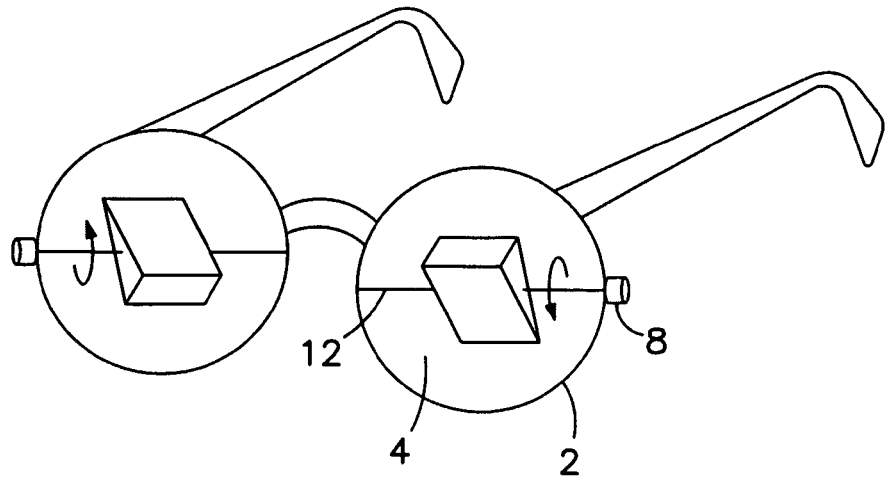
FIG. 3 is a second embodiment of the present invention.

The apparatus can also be designed with an axis 180 mount for the prism 4 as shown in FIG. 3, thereby orienting the prism 4 with base-up or base-down to treat altitudinal hemianopsia or diagonally for oblique angle field loss.

Figure 4:
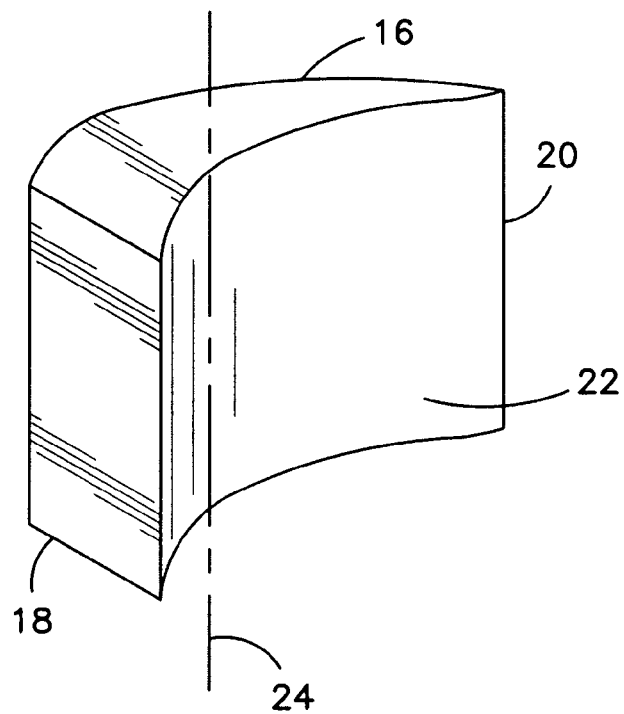
FIG. 4 is another embodiment of an enhanced visual field prism of the present invention.

As shown in FIG. 4, a second means of designing the prism 4' is shown through altering the base curve on the objective surface 22 of the prism 4'. For an individual with a right homonymous hemianopsia, base-right prism 4' is oriented with the axis 24 at 90 degrees and placed before both eyes under binocular conditions with the apex 20 of the prism 4' on the left. The objective surface 22 of the prism 4' can be designed with either a minus curve or a minus cylinder axis 24 curve toward the base end 18 of the prism 4'. Both will produce the effect of compression of the field that is progressive in nature by positioning the prism 4' and aligning the visual axis to look directly through the prism 4' before the accentuated curve in the base-out side of the prism 4'. The ocular surface 16 of the prism 4' can be designed with a corresponding plus cylinder axis to correspond with the minus cylinder axis on the objective side 22. This will minimize distortion.

Figure 5:
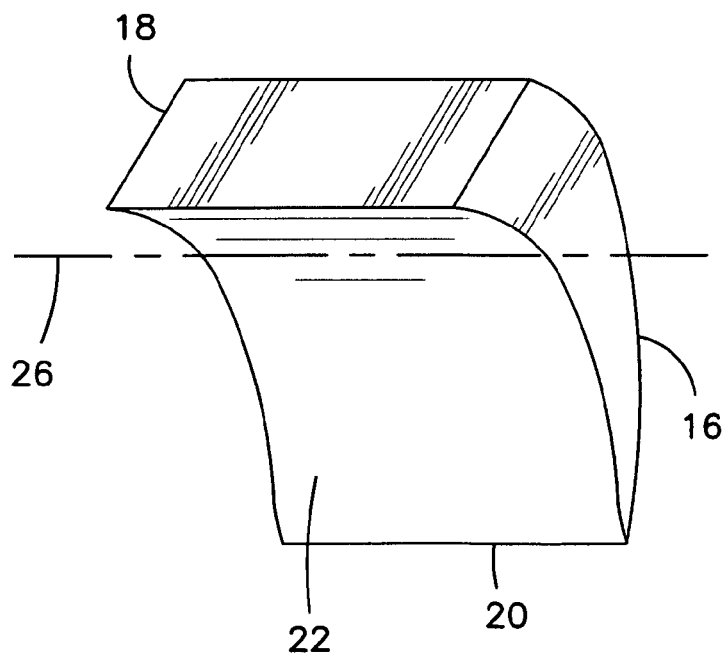
FIG. 5 is another embodiment of an enhanced visual prism of the present invention.

The apparatus can also be designed with an axis 26 at 180 degrees for the prism 4' as shown in FIG. 5, thereby orienting the prism 4' with base-up or base-down to treat altitudinal hemianopsia or diagonally for oblique angle field loss.

The progressive enhanced field prism apparatus of the present invention is a new and ingenious method of treatment for individuals who incur a homonymous hemianopsia following a CVA, TBI, or other vascular/neurological event. The device enables individuals to have improved function and performance as well as providing added safety.

It should be apparent to those skilled in the art that the above described embodiments represent only a few of the possible embodiments that could be made without departing from the spirit and scope of the present invention.

The invention claimed is:

1. An enhanced visual field binocular optical apparatus consisting of:
   a support means for being worn on a head of a user;
   two prisms; and
   a means for rotatably coupling said two prisms to said support means such that one of said two prisms is rotatably supported in front of one eye of said user and an other of said two prisms is rotatably supported in front of an other eye of the user to compensate for visual field lost and provide binocular vision and each of said one of said two prisms and said other one of said two prisms is rotatable about an axis transverse to an optical axis of said optical apparatus.

2. The enhanced visual field optical apparatus according to claim 1, wherein said prisms are selected from the group consisting of a yoke prism and an enhanced field prism.

3. The enhanced visual field optical apparatus according to claim 1, wherein the support means comprises a pair of eyeglass frames.

4. The enhanced visual field optical apparatus according to claim. 3, wherein corrective lenses with the required prescription of a user are provided in said eyeglass frames and said prisms are rotatably supported in front of said lenses.

5. The enhanced visual field optical apparatus according to claim 1, wherein each of said two prisms is rotatably supported about a vertical axis transverse to said optical axis.

6. The enhanced visual field optical apparatus according to claim 1, wherein each of said two prisms is rotatably supported about a horizontal axis transverse to said optical axis.

7. The enhanced visual field optical apparatus according to claim 2, wherein said enhanced field prism has a curved objective surface.

8. The enhanced visual field optical apparatus according to claim 7, wherein said objective surface has a minus curve or a minus cylinder axis 90 degree curve toward the base end of the prism.

9. A method of treating visual field loss utilizing the enhanced visual field optical apparatus according to claim 1, wherein each of said two prisms is rotated to a position wherein a base of each of said two prisms is displaced to the side of the visual field loss with the apex toward an eye of the user and the base away from the eye.

* * * * *